United States Patent
Garside

(10) Patent No.: US 10,744,442 B1
(45) Date of Patent: Aug. 18, 2020

(54) PRE-FILTER KIT AND RELATED METHOD OF USE

(71) Applicant: Outerwears, Inc., Schoolcraft, MI (US)

(72) Inventor: James E. Garside, Hickory Corners, MI (US)

(73) Assignee: Outerwears, Inc., Schoolcraft, MI (US)

( * ) Notice: Subject to any disclaimer, the term of this patent is extended or adjusted under 35 U.S.C. 154(b) by 862 days.

(21) Appl. No.: 15/420,402

(22) Filed: Jan. 31, 2017

Related U.S. Application Data

(60) Provisional application No. 62/289,667, filed on Feb. 1, 2016.

(51) Int. Cl.
| | | |
|---|---|---|
| *B01D 46/00* | (2006.01) | |
| *B01D 46/24* | (2006.01) | |
| *F02M 35/02* | (2006.01) | |
| *F02M 35/024* | (2006.01) | |

(52) U.S. Cl.
CPC ..... *B01D 46/0026* (2013.01); *B01D 46/0001* (2013.01); *B01D 46/0005* (2013.01); *B01D 46/24* (2013.01); *F02M 35/0216* (2013.01); *F02M 35/02408* (2013.01); *F02M 35/02483* (2013.01); *B01D 2279/60* (2013.01)

(58) Field of Classification Search
None
See application file for complete search history.

(56) References Cited

U.S. PATENT DOCUMENTS

| | | | | | |
|---|---|---|---|---|---|
| 4,747,031 A | * | 5/1988 | Huang | ...................... | F21V 1/06 362/352 |
| 2003/0081418 A1 | * | 5/2003 | Sviland | ...................... | F21V 1/16 362/356 |
| 2003/0132153 A1 | * | 7/2003 | Jelten | ...................... | B01D 29/15 210/232 |
| 2009/0196051 A1 | * | 8/2009 | Dick | ......................... | F21V 1/16 362/351 |

(Continued)

OTHER PUBLICATIONS

Amy Hodge, "Light me UP Lamp Shade Slip Cover Tutorial", Aug. 20, 2010, last visited Nov. 25, 2019 https://web.archive.org/web/20100830225409/http://www.amyalamode.com/blog/2010/08/20/light-me-up-lamp-shade-slip-cover-tutorial/ (Year: 2010).*

(Continued)

*Primary Examiner* — Bobby Ramdhanie
*Assistant Examiner* — Brit E. Anbacht
(74) *Attorney, Agent, or Firm* — Warner Norcross + Judd LLP

(57) ABSTRACT

A pre-filter kit and related method of use with an air filter associated with an intake of a machine is provided. The kit can include a sheet of pre-filter material, an adhesive component, such as an adhesive on a release liner, and one or more optional bands. The method can include: measuring a height of the air filter, cutting the sheet of pre-filter material so that the sheet includes a top edge and a bottom edge separated from one another by the height, as well as a first end and an opposing, second end; applying adhesive to the first end; and wrapping the sheet around the air filter so that the first end overlaps the second end to secure the first end to the overlapped portion of the sheet. The pre-filter is secured to the air filter so as to impair dirt, dust and debris from entering the air filter.

20 Claims, 6 Drawing Sheets

(56) References Cited

U.S. PATENT DOCUMENTS

2010/0206796 A1* 8/2010 Lauer .................. B01D 29/111
 210/232
2017/0234505 A1* 8/2017 Jones ..................... F21V 1/143
 53/430

OTHER PUBLICATIONS

Unexpected Elegance, video, May 26, 2015, last visited Nov. 25, 2019 https://web.archive.org/watch?time_continue=118&v=YCpbSLv2tHM&feature=emb_logo https://web.archive.org/web/20191126005331/http://web.archive.org/screenshot/https://www.youtube.com/watch?time_continue=118&v=YCpbSLv2tHM&feature=emb_logo (Year: 2.*

ISM "Mesh and Micron Sizes", Nov. 26, 2019, last visited Nov. 25, 2019 https://web.archive.org/save/https://www.industrialspec.com/resources/mesh-and-micron-sizes (Year: 2019).*

Alexis Rohlin, "How to Determine the Mesh Size of a Window Screen", Nov. 6, 2014, last visited Nov. 25, 2019 https://web.archive.org/web/20141106064422/https://homeguides.sfgate.com/determine-mesh-size-window-screen-25184.html (Year: 2014).*

MBK "Double Sided Tape and Differential Adhesive Tapes", Sep. 20, 2016, last visited Nov. 25, 2019 https://web.archive.org/web/20191125234309/https://www.echotape.com/blog/complete-technical-guide-double-sided-tape/ (Year: 2016).*

Echo Tape "The Complete Technical Guide for Double Sided Tape" Feb. 13, 2018, last visited Nov. 25, 2019 https://web.archive.org/web/20191125234309/https://www.echotape.com/blog/complete-technical-guide-double-sided-tape/ (Year: 2018).*

Air-Purifier-Power "Honeywell 38002 Replacement", Mar. 22, 2015, last visited Nov. 25, 2019 https://web.archive.org/web/20150322141703/http://www.air-purifier-power.com/replacementprefilter.html (Year: 2015).*

PreVent AC Filter downloaded from http://www.permatron.com/products/air-intake-solutions/prevent-air-intake-filters/prevent-wrap-around-.aspx on Oct. 19, 2015.

Kleen Screen AC Filter downloaded from http://www.amazon.com/Product-Group-Kleen-Screen-Around-Filter/dp/ 8004EVQB2C on Oct. 19, 2015.

Air Purifier Power downloaded from http://www.air-purifier-power.com/replacementprefilter.html on Oct. 19, 2015.

* cited by examiner

PRE-FILTER KIT AND RELATED METHOD OF USE

BACKGROUND OF THE INVENTION

The present invention relates to filters for machines that intake air, and more particularly, to a pre-filter kit that is installable on a variety of different sized air filters.

There is a variety of machines that include air intakes adapted to pull ambient air or gases into the machines and their components, such as an internal combustion engines, generators and industrial tools. Frequently, air filters are joined with the air intakes to prevent particles of dirt, dust, sand and other debris from entering those intakes and potentially causing damage to the machine and its components.

Some manufacturers, such as Outerwears Performance Products, of Schoolcraft, Mich., provide fitted pre-filters that are engineered and precisely pre-sized for installation around specific air filters of certain machines to further filter out unwanted materials, preventing them from reaching the intake. These pre-filters usually are fully constructed using intricate sewing techniques and include multiple assembled components, such as seams and the like. With the sewing and additional components, sometimes the pre-filters can be cost prohibitive to manufacture and sell at a price point that is alluring to consumers.

Accordingly, there remains room for improvement in the construction, supply and use of pre-filters in conjunction with air filters for machines.

SUMMARY OF THE INVENTION

A pre-filter kit and related method of use of a pre-filter is provided. In one embodiment, the pre-filter kit is adapted for use with an air filter that is installed on an air intake of a machine. The pre-filter kit can include a sheet of pre-filter material, optionally a woven mesh having a network of interweaved strands. The sheet can be adapted to be cut by a user or installer so that the sheet includes a top edge and a bottom edge separated from one another by a first height that corresponds to a length or other dimension of the air filter, as well as a first end and an opposing, second end. The sheet can be adapted to precisely fit around at least a portion of the air filter and achieve a particular geometric shape. The kit can include a release liner sheet having disposed thereon an adhesive that is for application to the first end of the sheet, as well as one or more optional bands adapted for placement adjacent the top edge and/or bottom edge to further secure the pre-filter to the air filter. Generally, the pre-filter is configured for securement to the air filter so as to impair dirt, dust and debris from substantially entering the air filter.

In another embodiment, the kit can include a transfer material, optionally in a transfer material element. The transfer material can be applied to a top and a bottom of the air filter. The air filter, with the transfer material applied, can be rolled across the sheet to outline the top edge and the bottom edge of the pre-filter sheet and provide a user with a guide or outline for precisely cutting the sheet. Optionally, an elongated rod adapted for joining with the first end and facilitating application of the sheet to the air filter can be provided with the kit.

In still another embodiment, a method of using the pre-filter is provided. The method can include: providing an air filter configured for installation on an air intake of a machine, the air filter including a top, a bottom and central portion therebetween; measuring a first height of the air filter; providing a sheet of pre-filter material; cutting the sheet of pre-filter material so that the sheet includes a top edge and a bottom edge separated from one another by the first height, as well as a first end and an opposing second end; applying adhesive to the first end; and wrapping the sheet around the air filter central portion, so that the top edge is adjacent the top of the air filter, and the bottom edge is adjacent the bottom of the air filter, and so that the first end overlaps the second end so as to secure the first end to the overlapped portion of the sheet. In this manner, the pre-filter can be secured to the air filter so as to impair dirt, dust and debris from substantially engaging or entering the air filter.

In yet another embodiment, the method can include overlapping an overlapped portion of the sheet, for example the second end, with the first end. The adhesive on the first end can engage the overlapped portion of the sheet, thereby adhering the sheet to itself and securing the sheet around the air filter.

In even another embodiment, the method can include: expanding a first band; placing the first band over the sheet adjacent the top edge; releasing the first band so that the first band squeezes the sheet against an exterior of the air filter adjacent the top edge; expanding a second band; placing the second band over the sheet adjacent the bottom edge; and releasing the second band so that the second band squeezes the sheet against the exterior of the air filter adjacent the bottom edge.

In a further embodiment, the method can be utilized in conjunction with an air filter installed on a machine, where the machine includes an internal combustion engine. The air intake can be in fluid communication with the internal combustion engine. The method can include running the internal combustion engine so that the internal combustion engine draws air under vacuum through the pre-filter and the air filter, and into the air intake, while the pre-filter impairs dirt, dust and debris from substantially engaging the air filter.

In still a further embodiment, the method can be utilized in conjunction with an air filter installed on a machine, where the machine is industrial tooling or other equipment, such as a CNC machine, and where the air intake is in fluid communication with the machine The method can include running the CNC machine so the CNC machine draws air under vacuum through the pre-filter and the air filter, into the air intake, and further into another component of the machine.

In yet a further embodiment, the method can include applying a transfer material to the top and bottom of the air filters, and rolling the air filter on the sheet of pre-filter material so that the transfer material generates an outline on the sheet of pre-filter material. The outline can correspond to the shape and certain dimensions of the air filter.

In even a further embodiment, the method can include: placing an elongated rod against the adhesive to secure the elongated rod to the first end; engaging the first end with the second end; and rotating the elongated rod to tighten the sheet of pre-filter material against the air filter.

In another, further embodiment, the method can include cutting an elastic band to a preselected length; joining first and second ends of the elastic band with a fastener; and wrapping the elastic band around the sheet of pre-filter material so as to urge the pre-filter material against an exterior of the air filter.

In a still another, further embodiment, the method can include utilizing a sheet of pre-filter material constructed from a woven mesh having a plurality of interweaved strands, each strand having a substantially circular cross section. Optionally, the sheet of pre-filter material can define multiple pores having a pore size of 10 microns to 500 microns, which can allow air to flow through the pores, under vacuum produced by or through the machine.

The current embodiments provide an economical, easy to install pre-filter kit and related method of use. With the kit and method, consumers and other installers can easily customize the pre-filter sheet to fit a variety of air filters used in many different applications. Further, manufacturing costs can be significantly reduced, so that the kit can be offered at economical prices. Thus, users who otherwise might not use a pre-filter, now can be enticed to do so.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
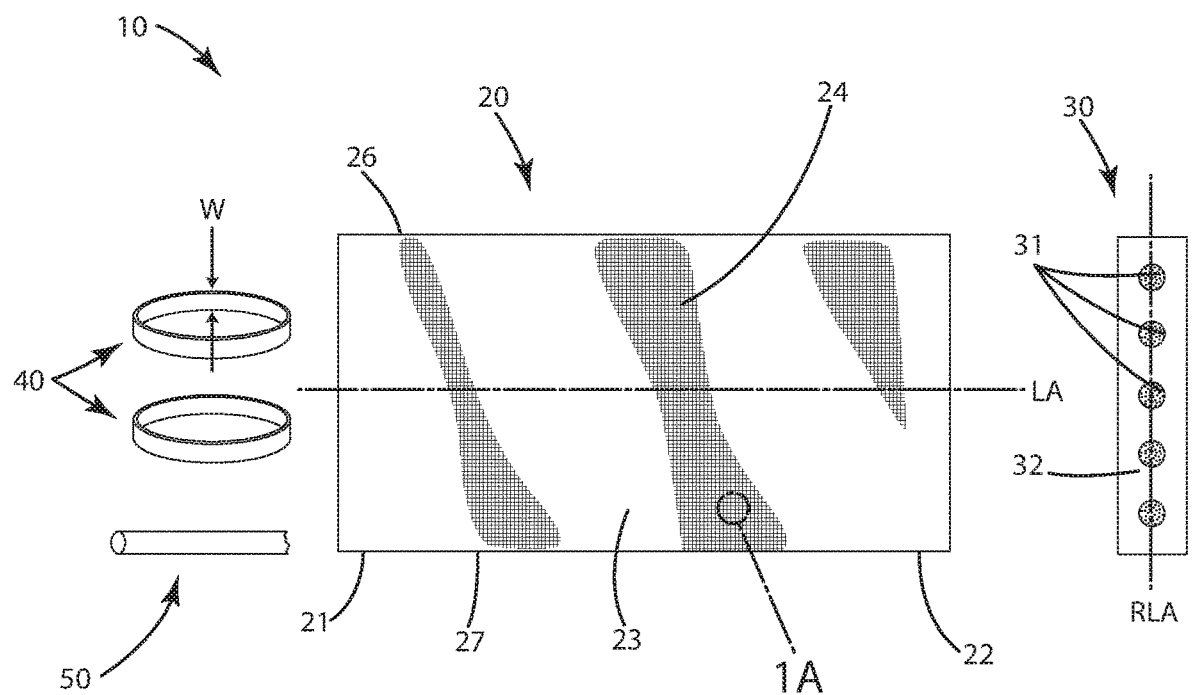
FIG. 1 is a perspective view of a pre-filter kit of a current embodiment.

A current embodiment of the pre-filter kit and related method of use is illustrated in FIGS. 1-5 and generally designated 10. In general, the pre-filter kit and related method of use herein are described in connection with installation relative to an air filter 90 on an air intake 95 of a component 99 of a machine 100. The air filter 90 can be constructed to include a top or first end 91, a second or bottom end 92, and a central portion 93. The top end 91 can be distal from the air intake 95, while the bottom end 92 can be made into and otherwise connected with the air intake 95. Both the top 91 and bottom end 92 can be of a circular shape. Optionally, the circular shapes can be of different sizes depending on the particular application, and whether the air filter is a cylindrical shape, a conical shape, a frustoconical shape or other geometric shape as further described below.

The central portion, top and and/or bottom ends can be constructed to include a filter media, such as a woven or nonwoven filter fabric, pleated filter paper, fiberglass filter media, activated carbon filter media, polyurethane foam filter media, polyester impingement filter media, metal mesh filter media and combinations thereof. Generally, the filter media is designed and configured to prevent dust, dirt and debris from entering the air intake, or otherwise passing from an exterior of the air filter to an interior of the main filter.

The air filter 90 can be joined with the air intake 95 via clamps, threads, a friction fit, or other mechanisms depending on the application. The air intake 95 itself can be constructed from metal, polymers and or composites and can include an internal passageway that is in fluid communication with the air filter as well as the component 99. The air intake can generate or transfer a vacuum generated by the component 99 of the machine 100 so as to pull or draw in air under negative pressure or under a vacuum, in through the filter 90 and into the intake 95.

Figure 2:
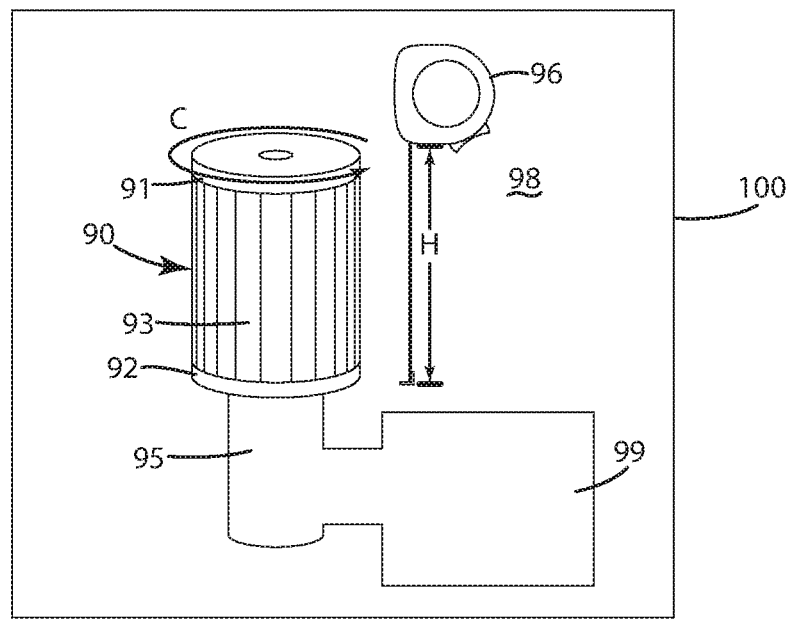
FIG. 2 is a perspective view of an air filter, air intake and machine with which the pre-filter kit is utilized.

The intake 95 as mentioned above can include an internal passageway that allows the flow of air through it into the component 99. The intake and air filter can be mounted on an interior or an exterior of the machine 100, but optionally can be mounted on an exterior of the component 99. The machine 100 can be a vehicle, industrial equipment, agricultural equipment, military equipment and the like. Where the machine 100 is a vehicle, the vehicle can be an off-road vehicle, a racing vehicle, a postal vehicle, an emergency vehicle, a livestock transportation vehicle, a waste collection vehicle, a military vehicle, a recreational vehicle, a watercraft, an aircraft and the like. As illustrated in FIG. 2, the machine 100 can include an engine bay and/or compartment 98 within which the air filter and component can be disposed. Of course, this compartment 98 can be open to the environment rather than closed as shown.

The component 99 can be a variety of elements adapted for use with the machine 100. For example, the component 99 can be an internal combustion engine, such as a gasoline engine and/or a diesel engine for use with vehicles or other machinery. The component 99 optionally can be a component of industrial equipment or tooling, such as a CNC machine, a robot, a fuel/air mixer, or other equipment.

Referring again to FIG. 1, the pre-filter kit 10 can include a sheet of pre-filter material 20, an adhesive component 30, one or more optional bands 40, as well as an optional transfer material element 50. The sheet of pre-filter material 20 can include an exterior surface 23 and a filter facing surface 24, which is designed face, and in some cases, contact the exterior of the air filter, for example near the central portion 93 thereof. The sheet 20 also can include a first end 21 and a second, opposing end 22. A longitudinal axis LA can extend generally from the first end 21 toward the second end 22 of the sheet 20. This longitudinal axis LA can be taken along the longest dimension of the sheet 20. The sheet 20 can further include a top edge 26 and a bottom edge 27. These edges, as well as the ends, can be varied upon cutting of the sheet 20 by a user. Thus, the overall dimensions of the sheet can be precisely varied to selectively fit a given air filter via a cutting operation as further explained below.

The sheet can be constructed from a pre-filter material. Suitable pre-filter materials include a woven mesh or a knitted fabric, constructed from nylon, polyester, polyamines and other polymeric materials. As shown in FIG. 1A, when in the form of a woven mesh, the sheet can include multiple individual strands 27A-27D. These individual strands can be interweaved one over the other, with the individual strands being generally perpendicular to one another. For example the strands 27A and 27B can be generally perpendicular to the strands 27C and 27D. The strand 27A also can extend over the strand 27D and under the strand 27C. Likewise the strand 27B can extend under the strand 27D and over the strand 27C. This pattern of over/under perpendicular or transverse strands can be repeated throughout the sheet where the sheet is a woven sheet. Optionally, the sheet of pre-filter material can be constructed from a knitted material including multiple interlooped strands, or from non-woven materials or membranes.

Optionally, the individual strands of the sheet can be constructed to have substantially round and/or circular cross sections 27E. In this manner, dust, debris and other particulate matter have a difficult time attaching to those substantially circular cross sectioned strands. Thus, the dust, debris and other particular matter can be readily removed from the sheet. Further optionally, the strands can be configured to form one or more pores 27P between adjacent strands. The pore size can be optionally 10 µm to 500 µm, further optionally 50 µm to 250 µm, and even further optionally 100 µm to 150 µm.

Figure 1A:
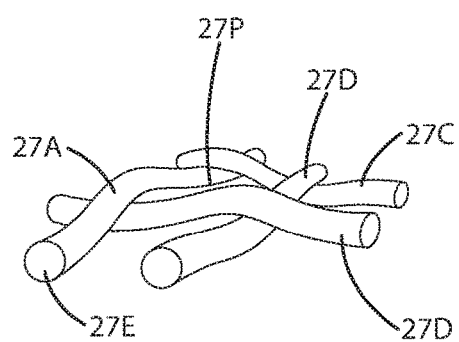
FIG. 1A is a close-up of a sheet of pre-filter material.

As shown in FIG. 1, the kit also can include an adhesive component 30. As illustrated, this adhesive component 30 can be in the form of a strip of a release liner. On the release, liner one or more dots of adhesive can be disposed. These dots of adhesive can be small areas of adhesive that are independent from one another and separated for another on the release liner by a distance. Of course, in some circumstances the multiple dots of adhesive can be replaced with a single strip of adhesive that extends along the longitudinal axis of the release liner RLA. In other constructions, the adhesive component 30 can simply be a strip of adhesive material or dots of adhesive material that is already adhered to the first end 21, the second end 22, or some other portion of the sheet 20, without a release liner being associated with the kit. The adhesive in such a construction can be heat activated, ultraviolet activated or activated selectively via some other mechanism.

Figure 5:
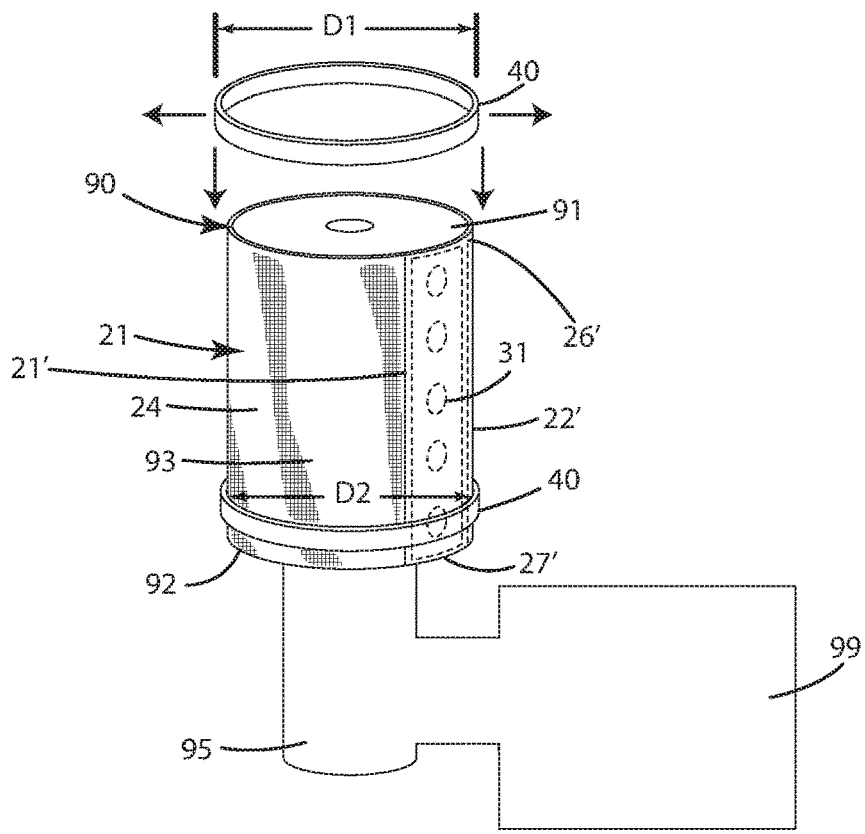
FIG. 5 is a schematic illustrating the sheet of pre-filter material applied to the air filter with optional bands being installed thereon.

As shown in FIG. 1, the kit optionally can include bands 40 that are sized and dimensioned to fit around the sheet of pre-filter material 20 when it is installed on the filter 90, for example as shown in FIG. 5. The bands can be constructed from an elastic material, an inelastic material, cord, rope, wire, fibers, strands and the like, all of which can be referred to as bands. The bands 40 optionally can be configured to circumferentiate the filter adjacent at least one of the top 91 and the bottom 92 of the filter. The bands can be configured to engage the exterior surface 23 of the sheet 20. The bands can be constructed from a material including an elastomeric component, silicone, rubber and the like. In some constructions, the bands can be a Spandex™ like material that stretches or is more elastic along the longest dimension of the band than along the width W of the band. The bands also can be constructed so as to form a closed loop or circle as illustrated in FIG. 1. As shown in FIG. 5, the bands can be elastically expanded to a dimension that is larger than the dimension of the filter 90 so the bands can be installed over the air filter adjacent the sheet of pre-filter material.

Although shown as continuous circles or loops as shown in FIG. 1, the bands 40 optionally can be altered. For example, as shown in the alternative embodiment a FIG. 6, the bands 140 and 145 can include free ends that can be joined with one another as shown via the direction of the arrows A adjacent the bands. The bands can be cut to a preselected length that corresponds to a circumference or other dimension of the air filter. The ends of the bands can then be overlapped by the user and fastened together with a fastener or other closure. For example, the ends of the band 140 can be fastened together with a fastener 143 after being precut to correspond to a circumference of an air filter. In that embodiment, the fastener can be a staple, a glue strip, an adhesive dot, a rivet, a tack, a pin, or some other device. As another example, the ends of the band 145 can be fastened together using a hook and loop fastening system or closure 146 that is associated with the respective ends of the band. Of course, other closure systems can be used to secure the ends of the bands with one another and provide a desired dimension of the respective bands.

Returning to the embodiment shown in FIG. 1, the kit 10 optionally can include a transfer material element 50. This element 50 can include within it or can be constructed from a transfer material. The transfer material can be any material that can be transferred to the sheet 20 and leave a marking or other indicia thereon. As illustrated, the transfer material element 50 can be a writing utensil constructed from chalk. The transfer material element 50 can be a pen, marker, crayon or other writing element that is capable of dispensing ink, paint, coating or other marking material onto the sheet to leave a visible outline in the location where the transfer material engages the sheet. The transfer material element 50 can be used to transfer the transfer material to the sheet based on measurements taken by a user of the air filter. In other cases, the user can apply transfer material to certain components of the air filter and roll or otherwise move the air filter over the sheet to transfer the transfer material to the sheet and provide an outline of an area to be cut from the sheet and conform to the dimensions and sizes of surfaces of the air filter.

A method of using a pre-filter of the current embodiment on an air filter will now be described in further detail with reference to FIGS. 2-5. To begin, a user can measure a height H of the air filter 90 with a measuring tool such as a tape measure 96. This height can extend between the top 91 and bottom 92 of the air filter, generally spanning across the central portion 93. Of course, depending on the application and the construction of the air filter, this height H may extend across some other central portion of the air filter, rather than extending completely from the top to the bottom. Optionally, the user can use the measuring device 96 to measure a circumference C around the filter 90 at the top, bottom and/or central portion of the air filter.

Figure 3:
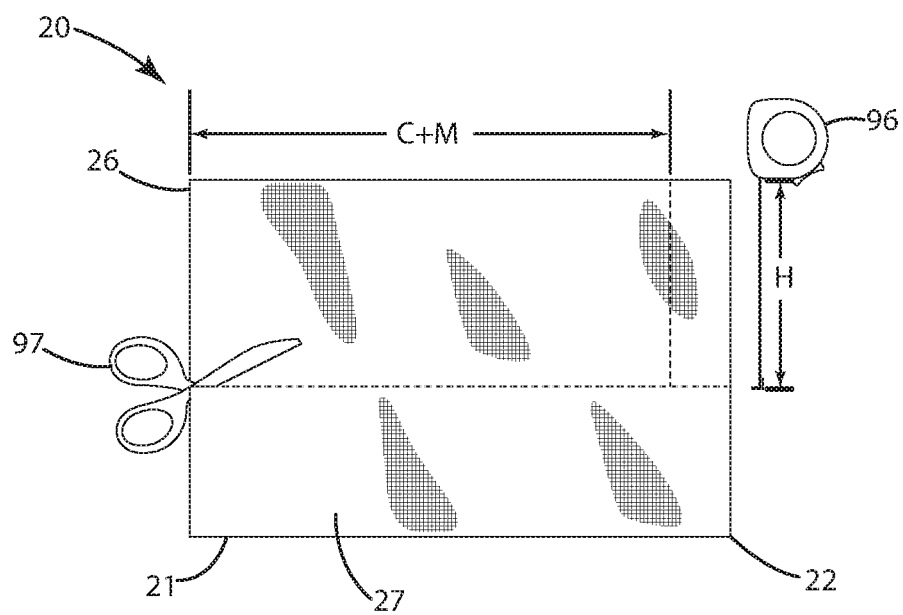
FIG. 3 is a schematic illustrating the measurement and cutting of the sheet of pre-filter material.
Figure 4:
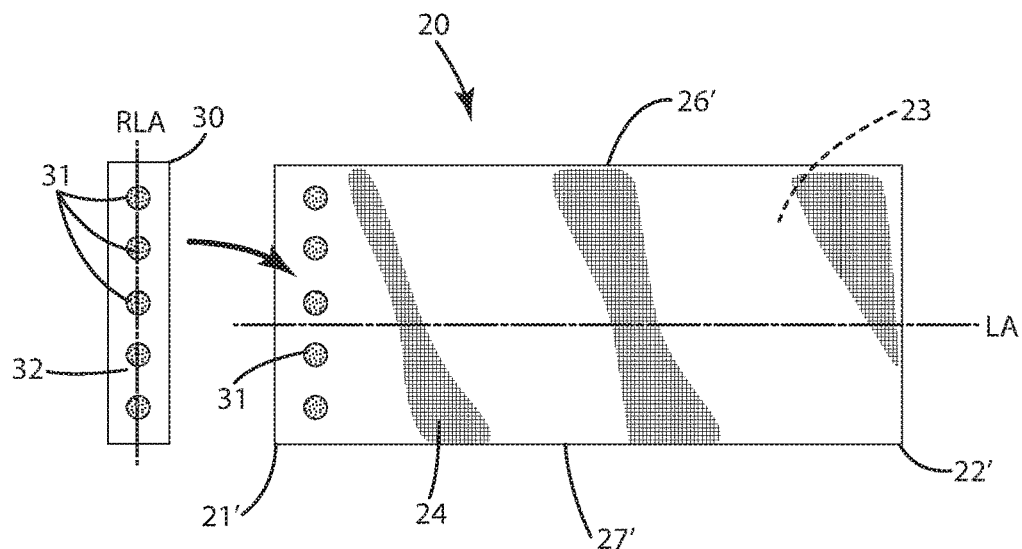
FIG. 4 is a schematic illustrating the application of adhesive to an end of the sheet of pre-filter material.

As shown in FIG. 3, using the measuring device 96, the user can measure the sheet 20 at the first and second ends 21 and 22 and establish a height H that corresponds to the height of the air filter 90. The user can mark a line with the material transfer element 50 if desired. The user also can measure the sheet along the top edge 26 and/or bottom edge 27 to correspond to a length equal to the circumference C of the air filter 90 plus some margin M so that the new ends 21' and 22' of the cut sheet can overlap one another a preselected distance (C+M) corresponding to the margin.

After the sheet of pre-filter material 20 is cut to the desired height and length, for example C+M or some other length, the user can cut the sheet with a cutting tool 97. This cutting tool can be scissors, a razor, a die cut, for a laser, or some other cutting device. After the optional cutting, the resultant sheet is in the form shown in FIG. 4. There, the sheet extends a length along the longitudinal axis LA from the first end 21' to the second end 22', and extends a width from the top edge 26' to the bottom edge 27'. At this point, the user can apply the adhesive component one of the ends, for example the first end 21'. Of course, the adhesive can be applied in different regions depending on the application. To do so, the user can press the release liner 32 against the first end 21', with the adhesive dots or strip engaging the interior 24 or exterior 23 surface of the sheet 20. Optionally, the release liner longitudinal axis RLA can be generally perpendicular to the longitudinal axis LA of the sheet 20. The adhesive adheres to the individual strands of the sheet and permeates into some of the pores defined between the strands. The user can then pull the release liner 32 away from the sheet, leaving the adhesive 31 secured to the sheet 20.

Referring to FIG. 5, the user can install the precut sheet of pre-filter material 20 on the air filter 90. To do so, the user wraps material 20 around the central portion 93 of the filter 90. Because the air filter shown is generally cylindrical, the sheet easily wraps around it circumferentiates the exterior of the air filter 90. The sheet can be disposed between the top 91 and bottom 92 of the air filter. The upper edge 26' can lay adjacent the top 91, while the lower edge 27' can lay adjacent the bottom 92 of the air filter 90. These components can be adjacent one another due to the precise measurement of the height of the air filter and careful cutting of the sheet to correspond to the same.

The first end 21', with the adhesive strip or dots 31 facing inward is overlapped over an overlapped portion of the sheet 20. For example, the overlapped portion can be the second end 22'. The user can press the first end against the overlapped portion of the sheet thereby engaging the adhesive against that overlapped portion. In turn, this secures the first end and to the overlapped portion so that the sheet remains a fixed around and surrounds the air filter 90. In some cases, where the adhesive is particularly strong, this can complete the installation of the pre-filter on the air filter.

As illustrated in FIG. 5, however, the user optionally can expand the bands 42 to an enlarged dimension, stretching the bands in the direction of the arrows. The user can then fit the expanded bands over the exterior surface 24 of the sheet 20, generally adjacent the upper and lower edges of the sheet and/or adjacent the top and bottom of the filter. The user can then release the bands from the expanded state thereby causing them to contract to a smaller dimension D2. This in turn squeezes the sheet or otherwise secures it better against the exterior surface of the filter. Generally, the bands can be applied adjacent and under the top and above the bottom of the filter, for example, each being about 1 mm to about 20 mm from the top and bottom of the air filter. These optional bands can provide additional securement of the sheet to the air filter in case the adhesive fails.

With the pre-filter is adequately installed on the air filter, the component 99 can be run or otherwise operated. This in turn causes air to be drawn into the air intake 95 through the air filter 90 and the sheet of pre-filter material 20 applied to the air filter. The pre-filter can prevent dust, dirt and other debris from passing through it to the filter 90. This further prevents the material from passing into the air intake 95 and/or the component 99 as it operates.

After operating for a period, particularly in a dirty or dusty environment, dirt debris in other material can conglomerate on the surface of the pre-filter 20. Due to the nature of the sheet of pre-filter material, these materials can be easily brushed off from the pre-filter. In some cases, a user can remove the bands and pull the pre-filter off the air filter. The user can then shake and/or otherwise deform the pre-filter to remove the dirt, dust and other debris therefrom. The user can reinstall the pre-filter on the air filter as mentioned above.

Figure 6:
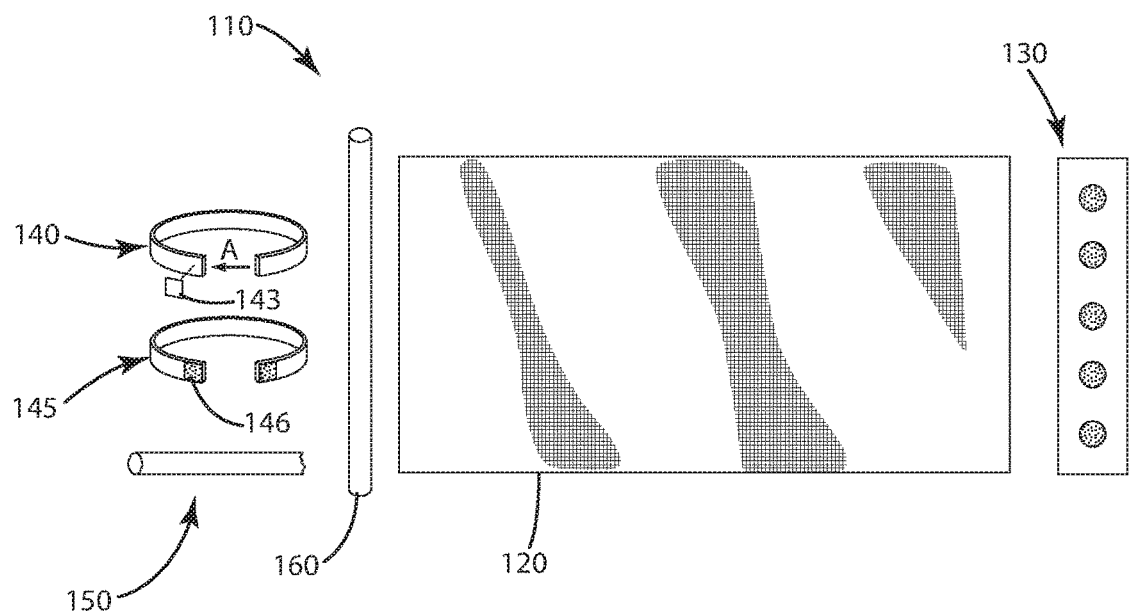
FIG. 6 is a perspective view of a first alternative embodiment of the pre-filter kit.
Figure 7:
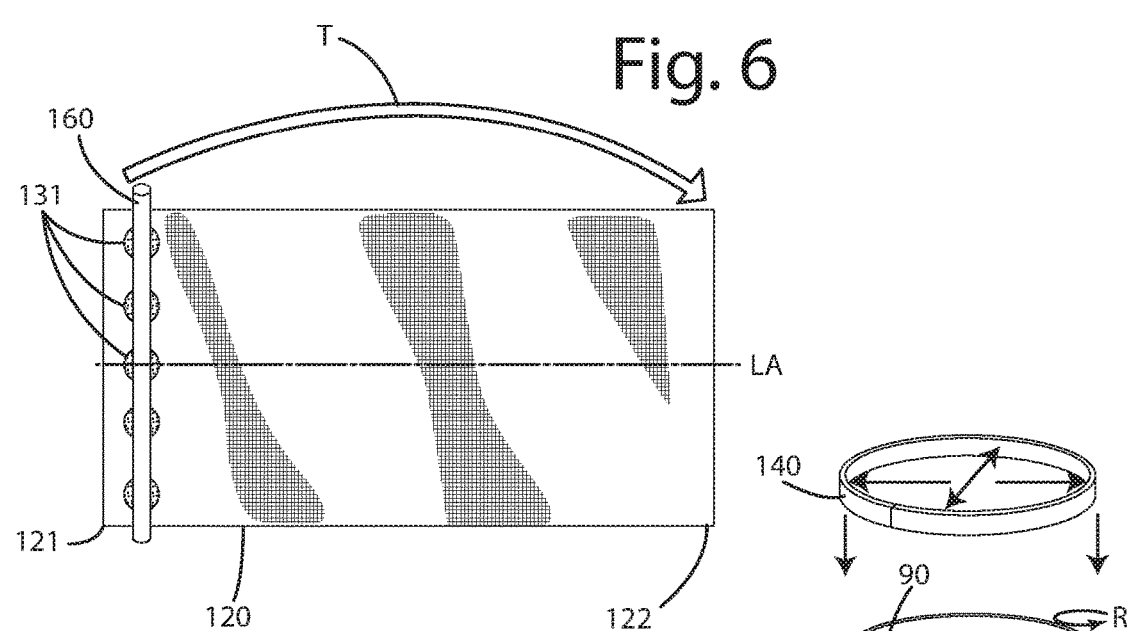
FIG. 7 is a perspective view of a sheet of pre-filter material being rolled into a tube.

A first alternative embodiment of the pre-filter kit is illustrated in FIG. 6 and generally designated 110. This embodiment is similar in structure, function and operation to the embodiment described above, with several exceptions. For example, this embodiment can include the bands 140 and 145 that have free ends are joined with special closures and/or fasteners as described above. Further, this kit can include an optional transfer material element 150 that can be used to mark the desired dimensions of the sheet for cutting. The kit 110 also can include an adhesive component 130 can be similar to that described above. In addition however, the kit can be outfitted with an elongated rod or other elongated member 160. This elongated member can be constructed from plastic, wood, or some other material.

Figure 8:
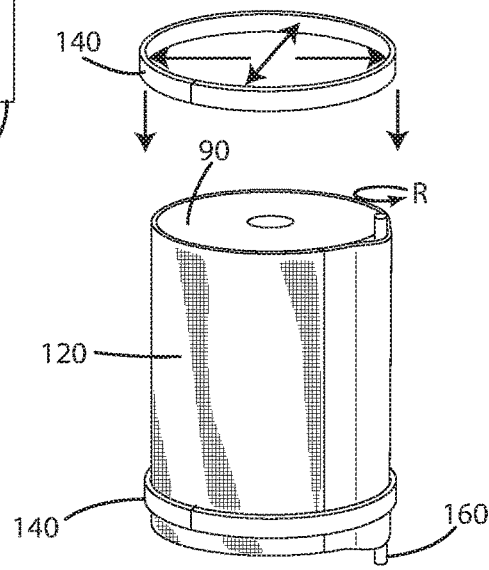
FIG. 8 is a perspective view of the sheet of pre-filter material of the kit installed on the air filter, with optional bands being installed thereon.
Figure 9:
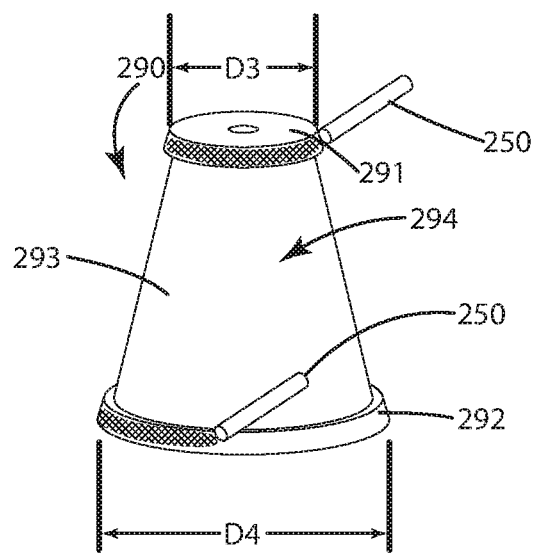
FIG. 9 is a perspective view of a second alternative embodiment of the pre-filter kit being used in conjunction with a frustoconical air filter.

This elongated rod 160 can be used to install the sheet 120 on the air filter 90. For example, the elongated rod 160 can be adhered via adhesive 131 to a first end 121 of the sheet 120. The elongated rod 160 can be generally perpendicular to the longitudinal axis LA of the sheet 120. The first end 121, with the associated elongated rod 160, can be moved in direction T toward the second end 122. The ends can be placed adjacent one another in the elongated rod 160 can be rotated to form the sheet 120 generally into a tube and/or cylindrical shape. The sheet 120, in a tube like configuration, can be installed on the filter 90 as shown in FIG. 8. The elongated rod 160 can be further rotated in direction R to tighten the sheet against the exterior surfaces of the filter 90. The optional bands 140 can be installed over the sheet 120 to urge or squeeze it against the exterior or other components of the air filter 90, thereby further securing the pre-filter to the air filter. With the pre-filter properly installed on the air filter, an associated component can be run to draw air through the air filter 90 and into a respective air intake as with the embodiment above.

A second alternative embodiment of the pre-filter kit and associated method is illustrated in FIGS. 9-12. This embodiment is similar in structure, function and operation to the embodiments described above, with several exceptions. For example, this embodiment can include a pre-filter kit having components identical or similar to the pre-filter kit 10 or 110 noted above. In this embodiment, however the pre-filter kit is used to install a pre-filter on a conical and/or frustoconical type air filter 290, which differs in shape relative to the cylindrical air filter 90 discussed above. For example, the frustoconical air filter shown in FIG. 9 includes a top 291 and a bottom 292, with a central portion 293 therebetween. The top 291 has a dimension, for example, a diameter D3 that is less than the diameter D for of the bottom 292 of the filter 290. Accordingly, the sheet 220 of pre-filter material optionally is cut a particular manner so that it adequately fits over the exterior surface 294 of the filter.

Figure 10:
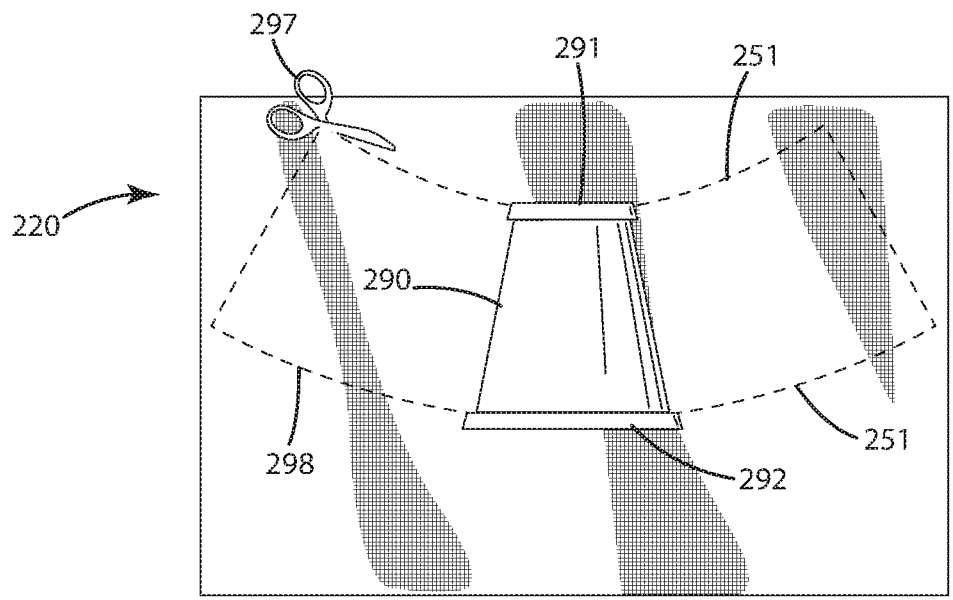
FIG. 10 is a perspective view of a transfer material of the pre-filter kit being applied to a sheet of pre-filter material so as to outline a cutting area that corresponds to the surfaces of the frustoconical air filter.
Figure 11:
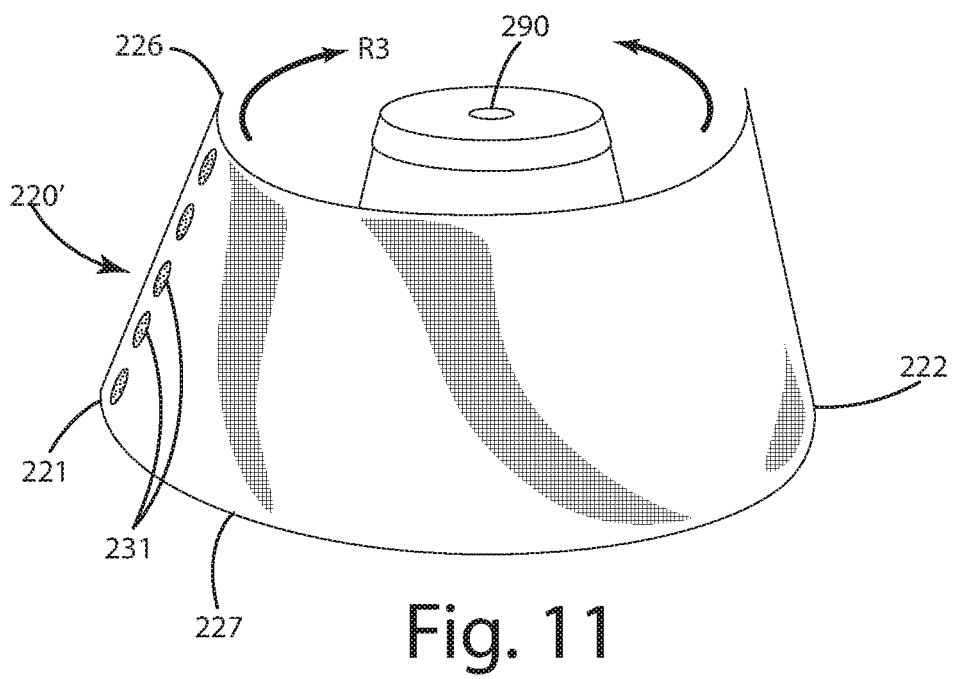
FIG. 11 is a perspective view of the sheet of pre-filter material with adhesive applied to an end, the sheet being further applied to the surface of the frustoconical air filter.
Figure 12:
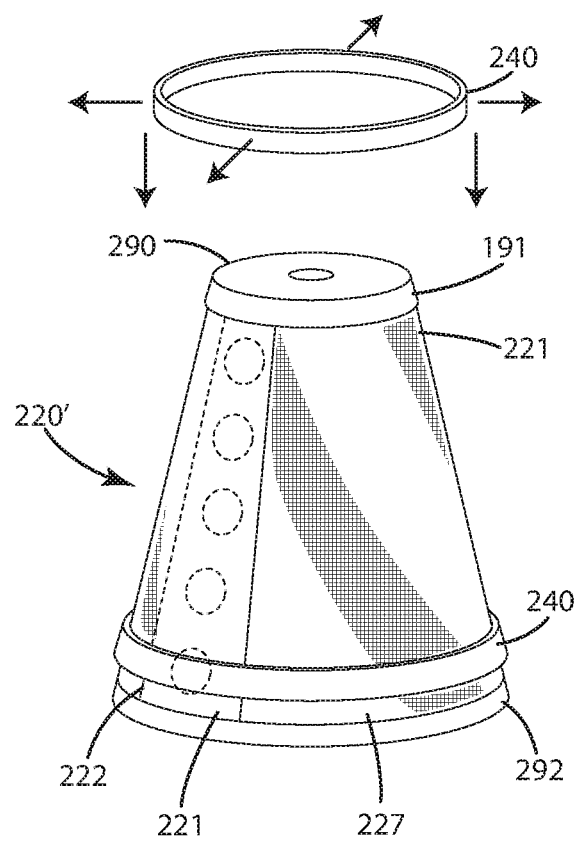
FIG. 12 is a perspective view of the sheet of pre-filter material of the kit installed on the frustoconical air filter, with optional bands being installed thereon.

To facilitate the precise cutting of the sheet to 20, transfer material elements 250 are used to transfer the transfer material to the respective top 291 and bottom 292 of the filter 290. With the transfer material disposed on these portions, the filter 290 can be rolled on the sheet 220 in directions R2 as shown in FIG. 10. This in turn deposits the transfer material 251 from the top and bottom of the filter 290 onto the sheet 220, thereby creating an outline 298 that mimics or otherwise corresponds to the exterior surface 294 of the air filter 290. After the outline to 98 is created with transferred transfer material 251 on the sheet 220, the air filter 290 can be removed from the sheet R. A user can utilize a cutting device 297 to cut along the outline 298, thereby forming a fitted pre-filter sheet 220', as shown in FIG. 11. The user can apply adhesive 231 to the first end 221 of the fitted sheet 220'. The user can wrap the sheet 220' in direction R3 around the frustoconical air filter 290. The respective ends 221 and 222 of the sheet can overlap one another as shown in FIG. 12. The adhesive can secure these ends to one another. The sheet top edge 226 can be adjacent the top 291 of the air filter, while the sheet bottom edge 227 and the adjacent the bottom 292 of the air filter, due to the precise cutting of the sheet 220'. When installed, the sheet 220' can generally take on a frustoconical shape that mimics that of the air filter 290. Optionally, bands 240 can be placed adjacent the top and bottom of the air filter to further secure the sheet or pre-filter 220' to the air filter 290.

Optionally, although not shown, this embodiment of the kit can include and can implement an elongated rod like that described in the embodiments above. For example, an elongated rod can be attached, and optionally adhered via adhesive to one of the ends of the sheet. The elongated rod can be rotated to tighten the sheet against the exterior surfaces of the filter upon installation on the filter.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A method of using a pre-filter with an air filter comprising:
    providing an air filter configured for installation on an air intake of a machine, the air filter including a top, a bottom and central portion therebetween, the air filter being of at least one of a cylindrical shape and a frustoconical shape, the air filter having an interior and an exterior, with a filter material therebetween, sufficient to allow air to flow from the exterior to the interior, the air filter having a first height between the top and the bottom of the air filter;
    providing a sheet of pre-filter material constructed from a woven mesh having a plurality of interweaved strands, each strand having a substantially circular cross section;
    cutting the sheet of pre-filter material so that the sheet includes a top edge and a bottom edge separated from one another by the first height, as well as a first end and an opposing second end;
    providing a release liner having disposed thereon an adhesive;
    engaging the release liner against the first end so as to apply the adhesive to the first end;
    removing the release liner from the first end with the adhesive remaining on the first end;
    wrapping the sheet of pre-filter material around the air filter central portion, so that the top edge is adjacent the top of the air filter, and the bottom edge is adjacent the bottom of the air filter, and so that the first end overlaps an overlapped portion of the sheet, with the adhesive on the first end engaging the overlapped portion of the sheet so as to secure the first end to the overlapped portion of the sheet;
    elastically expanding a first band;
    placing the first band over the sheet of pre-filter material adjacent the top edge;
    releasing the first band so that the first band squeezes the sheet of pre-filter material against the exterior of the air filter adjacent the top edge;
    elastically expanding a second band;
    placing the second band over the sheet of pre-filter material adjacent the bottom edge; and
    releasing the second band so that the second band squeezes the sheet of pre-filter material against the exterior of the air filter adjacent the bottom edge,
    whereby the sheet of pre-filter material is secured to the air filter so as to impair dirt, dust and debris from substantially engaging the air filter.

2. The method of claim 1, comprising:
applying a transfer material to the top and bottom of the air filter;
rolling the air filter on the sheet of pre-filter material so that the transfer material transfers to the sheet and outlines a shape; and
cutting the sheet of pre-filter material along the outline of the shape.

3. The method of claim 2 wherein the air filter is a frustoconical shape, and wherein the top edge is shorter than the bottom edge in length.

4. The method of claim 2 wherein the air filter is a cylindrical shape, and wherein the top edge is equal to the bottom edge in length.

5. The method of claim 1, wherein the sheet of pre-filter material has a plurality of pores each with a pore size of 10 microns to 500 microns, comprising allowing air to flow through the plurality of pores under vacuum generated by the machine.

6. The method of claim 1,
wherein the machine includes an internal combustion engine,
wherein the air intake is in fluid communication with the internal combustion engine, and
comprising engaging the internal combustion engine so that the internal combustion engine draws air under vacuum through the sheet of pre-filter material and the air filter, and into the air intake.

7. The method of claim 1,
wherein the adhesive permeates pores of the first end and the overlapped portion to secure the first end to the overlapped portion.

8. The method of claim 7 wherein the adhesive is in the form of at least one of a continuous strip and a plurality of dots on the release liner before pressing the release liner against the first end of the sheet of pre-filter material.

9. A method of using a pre-filter with an air filter comprising:
providing an air filter configured for installation on an air intake of a machine, the air filter including a top, a bottom and central portion therebetween, the air filter having a first height;
providing a sheet of woven pre-filter material;
cutting the sheet of woven pre-filter material so that the sheet includes a top edge and a bottom edge separated from one another by the first height, as well as a first end and an opposing second end;
applying adhesive to the first end; and
wrapping the sheet around the air filter central portion, so that the top edge is adjacent the top of the air filter, and the bottom edge is adjacent the bottom of the air filter, and so that the first end overlaps an overlapped portion of the sheet, so as to secure the first end to the overlapped portion of the sheet,
whereby the sheet of woven pre-filter material is secured to the air filter so as to impair dirt, dust and debris from substantially engaging the air filter.

10. The method of claim 9 wherein the overlapped portion in the second end, wherein first end overlaps the second end with the adhesive on the first end engaging the second end.

11. The method of claim 9 comprising:
elastically expanding a first band;
placing the first band over the sheet adjacent the top edge;
releasing the first band so that the first band squeezes the sheet against an exterior of the air filter adjacent the top edge;
elastically expanding a second band;
placing the second band over the sheet adjacent the bottom edge; and
releasing the second band so that the second band squeezes the sheet against the exterior of the air filter adjacent the bottom edge.

12. The method of claim 9,
wherein the machine includes an internal combustion engine,
wherein the air intake is in fluid communication with the internal combustion engine, and
comprising running the internal combustion engine so that the internal combustion engine draws air under vacuum through the sheet of woven pre-filter material and the air filter, and into the air intake.

13. The method of claim 9 comprising:
applying a transfer material to the top and bottom of the air filter; and
rolling the air filter on the sheet of woven pre-filter material so that the transfer material generates an outline on the sheet of woven pre-filter material.

14. The method of claim 9 comprising:
placing an elongated rod against the adhesive to secure the elongated rod to the first end;
engaging the first end with the second end; and
rotating the elongated rod to tighten the sheet of woven pre-filter material against the air filter.

15. The method of claim 9 comprising:
cutting an elastic band to a preselected length;
joining first and second ends of the elastic band with a fastener; and
wrapping the elastic band around the sheet of woven pre-filter material so as to urge the sheet of woven pre-filter material against an exterior of the air filter.

16. The method of claim 9 comprising:
measuring the first height of the air filter;
measuring a first circumference of the air filter; and
cutting the sheet of woven pre-filter material so that a distance between the first end and the second end is greater than the first circumference.

17. The method of claim 9,
wherein the machine is a CNC machine,
wherein the air intake is in fluid communication with the CNC machine, and
comprising running the CNC machine so CNC machine draws air under vacuum through the sheet of woven pre-filter material and the air filter, and into the air intake.

18. A pre-filter kit adapted for installation on an air filter, comprising:
a sheet of pre-filter material constructed from a woven mesh having a plurality of interweaved strands, each strand having a substantially circular cross section, the sheet adapted to be cut so that the sheet includes a top edge and a bottom edge separated from one another by a first height, as well as a first end and an opposing second end;
a release liner having disposed thereon an adhesive, the adhesive adapted for application to the first end;
a first band adapted for placement adjacent the top edge; and
a second band adapted for placement adjacent the bottom edge;
whereby the sheet of pre-filter material is configured for securement to the air filter so as to impair dirt, dust and debris from substantially engaging the air filter.

19. The method of claim 1, wherein:

the sheet of pre-filter material has an interior surface and an exterior surface;

engaging the release liner against the first end so as to apply the adhesive to the first end comprises pressing the release liner against the first end, with the adhesive engaging one of the interior surface and the exterior surface of the sheet of pre-filter material at the first end;

wrapping the sheet of pre-filter material around the air filter central portion comprises placing the interior surface directly against the air filter and pressing the first end against the other one of the interior surface and the exterior surface of the sheet at the overlapped portion of the sheet of pre-filter material to engage the adhesive against the overlapped portion; and placing the first and second bands over the sheet of pre-filter material comprises placing the first and second bands on the exterior surface of the sheet of pre-filter material, with the first and second bands extending over the adhesively-secured overlapped portion.

20. The method of claim 19, wherein:

cutting the sheet of pre-filter material comprises cutting the sheet to a length equal to a circumference of the air filter plus a margin so that the first end overlaps the overlapped portion of the sheet a preselected distance corresponding to the margin; and the adhesive is applied on the margin so as to be covered by the overlapped portion when the sheet of pre-filter material is wrapped around the air filter central portion.

* * * * *